(12) United States Patent
Govindassamy

(10) Patent No.: US 10,382,944 B1
(45) Date of Patent: Aug. 13, 2019

(54) METHOD AND APPARATUS FOR NETWORK PROCEDURES BY CLIENT DEVICES THROUGH MOBILE HOTSPOT

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

(*) Notice: Subject to any disclaimer, the term of this patent is extended or adjusted under 35 U.S.C. 154(b) by 0 days.

(21) Appl. No.: 15/891,623

(22) Filed: Feb. 8, 2018

Related U.S. Application Data

(63) Continuation of application No. 15/887,362, filed on Feb. 2, 2018.

(51) Int. Cl.
*H04W 8/08* (2009.01)
*H04W 36/08* (2009.01)
*H04W 84/12* (2009.01)

(52) U.S. Cl.
CPC ............ *H04W 8/08* (2013.01); *H04W 36/08* (2013.01); *H04W 84/12* (2013.01)

(58) Field of Classification Search
CPC ....... H04W 8/02; H04W 4/80; H04W 84/042; H04W 16/20; H04W 16/225; H04W 36/04; H04W 48/10; H04W 4/06; H04W 52/0209; H04W 52/0216; H04W 52/0219; H04W 52/0229; H04W 64/003; H04W 68/005; H04W 68/02; H04W 76/28; H04W 84/12; H04W 88/04
See application file for complete search history.

(56) References Cited

U.S. PATENT DOCUMENTS

| | | | |
|---|---|---|---|
| 9,237,448 B2 * | 1/2016 | Choyi | H04L 63/08 |
| 9,998,898 B1 * | 6/2018 | Govindassamy | H04W 16/20 |
| 10,051,533 B2 * | 8/2018 | Fitzpatrick | H04W 48/18 |
| 10,154,455 B1 * | 12/2018 | Govindassamy | H04W 52/0209 |

* cited by examiner

*Primary Examiner* — Kashif Siddiqui
(74) *Attorney, Agent, or Firm* — Lerner, David, Littenberg, Krumholz & Mentlik, LLP

(57) ABSTRACT

A mobile Hotspot is a device that includes a modem for wide area mobile broadband access and a Hotspot Access Point to distribute the internet to local client devices over a local area network such as Wi-Fi. Some of the local client devices may have mobile broadband capability of their own but may use the internet service from the mobile Hotspot when connected to it. In that case the client device may still need to maintain the communication link with the wide area mobile broadband network even when not actively using its services. A method and apparatus are disclosed that enable a mobile Hotspot to maintain the communication link with the wide area mobile broadband network on behalf of the client device. This may enable the client device with mobile broadband connection capability to reduce its power consumption.

20 Claims, 17 Drawing Sheets

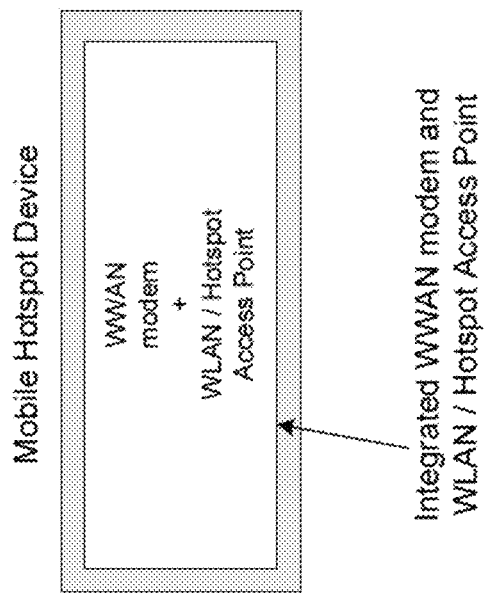

FIG. 6

| Combined Multi Client TAU | ← Message ID |
|---|---|
| Client Device Connection Status | |
| Number of Client Devices Connected | |
| Client Device 1 TAU Record | |
|     Client Device 1: Parameter 1 | |
|     Client Device 1: Parameter 2 | |
|     ... | |
|     Client Device 1: Parameter $n$ | |
| Client Device 2 TAU Record | |
|     Client Device 2: Parameter 1 | |
|     Client Device 2: Parameter 2 | |
|     ... | |
|     Client Device 2: Parameter $n$ | |
|     ... | |
| Client Device $m$ TAU Record | |
|     Client Device $m$: Parameter 1 | |
|     Client Device $m$: Parameter 2 | |
|     ... | |
|     Client Device $m$: Parameter $n$ | |

FIG. 9

| |
|---|
| Combined Multi Client Tunneled TAU  ← Message ID |
| Client Device Connection Status |
| Number of Client Devices Connected |
| Client Device 1 TAU Record |
|     Client Device 1: Parameter 1 |
|     Client Device 1: Parameter 2 |
|     ... |
|     Client Device 1: Parameter $n$ |
| ... |
| Client Device $m$ TAU Record |
|     Client Device $m$: Parameter 1 |
|     Client Device $m$: Parameter 2 |
|     ... |
|     Client Device $m$: Parameter $n$ |
| PLMN ID 1 |
| RAT ID 1 |
| Client Device 1 TAU Record |
|     Client Device 1: Parameter 1 |
|     Client Device 1: Parameter 2 |
|     ... |
|     Client Device 1: Parameter $n$ |
| ... |
| Client Device $m$ TAU Record |
|     Client Device $m$: Parameter 1 |
|     Client Device $m$: Parameter 2 |
|     ... |
|     Client Device $m$: Parameter $n$ |
| ... |
| PLMN ID $k$ |
| RAT ID $k$ |
| Client Device 1 TAU Record |
|     Client Device 1: Parameter 1 |
|     Client Device 1: Parameter 2 |
|     ... |
|     Client Device 1: Parameter $n$ |
| ... |
| Client Device $p$ TAU Record |
|     Client Device $p$: Parameter 1 |
|     Client Device $p$: Parameter 2 |
|     ... |
|     Client Device $p$: Parameter $n$ |

METHOD AND APPARATUS FOR NETWORK PROCEDURES BY CLIENT DEVICES THROUGH MOBILE HOTSPOT

CROSS-REFERENCE TO RELATED APPLICATIONS

This application is a continuation of U.S. application Ser. No. 15/887,362, filed Feb. 2, 2018, the disclosure of which is incorporated herein by reference.

BACKGROUND

A client device as defined in the present disclosure is a device that may access voice, video, text, instant messaging, internet and other services from a number of sources including wireless communication networks, Wi-Fi, Ethernet, etc. Such client devices may include conventional devices such as a smartphone, a tablet, a feature-phone, a laptop, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, an industrial equipment, etc.

The wireless communication networks are often referred to as Wireless Wide Area Network (WWAN). The internet service offered by such networks is often referred to as mobile broadband internet or Mobile Broadband (MB) and the WWANs are often referred to as mobile broadband networks. The terms WWAN and MB are used interchangeably herein. An example of a mobile broadband network may be based on the Long Term Evolution (LTE) from the 3rd Generation Partnership Project (3GPP). The LTE technology and its evolution are often referred to as fourth generation (4G) technologies. A client device may also use any of the previous generation technologies such as "2G", "3G" from 3GPP and other standardization bodies. A client device and a network may also use future generation technologies for current and new services. A WWAN operator may deploy multiple Radio Access Technologies (RATs) such as 3GPP LTE, 3GPP Universal Mobile Telecommunications Service (UMTS), Global System for Mobile communication (GSM), Code Division Multiple Access (CDMA), Evolution Data Only/Evolution Data Optimized (EVDO), etc. Different client devices with different capabilities may connect to the WWAN using different suitable RATs for getting internet service. There may be one or more WWAN operators providing service in a particular geographic area. Each WWAN operator may use the same or different types of RATs. For providing end-to-end services, a WWAN many include, in addition to RATs, other network elements such as gateways and interfaces with other networks. Some client devices may have capability of supporting multiple Subscriber Identity Modules (SIMs) corresponding to different WWAN internet service providers. Some client devices with multiple SIMs may be able to get internet service from multiple WWANs simultaneously.

Typically, as shown in FIG. 1, a WWAN comprises one or more base stations. Other network devices may also be employed, such as a mobile switching center (not shown). As illustrated in FIG. 1, the communication path from the base station (BS) to the client device or mobile station (MS) is referred to herein as a downlink (DL) direction or downlink channel. The communication path from the client device to the base station is referred to herein as an uplink (UL) direction or uplink channel. In some wireless communication systems, the client device communicates with the BS in both the DL and UL directions. For instance, such communication is carried out in cellular communication systems. In other wireless communication systems, the client device communicates with the base stations in only one direction, usually the DL. Such DL communication may occur in applications such as paging. Typically in a wireless communication system, the client device and the base station may transmit information in blocks of data and such a block of data is referred herein as a "message."

A base station to which a client device may be downlink synchronized and/or communicating at any given time is referred herein as the Serving Base Station (SBS). In some wireless communication systems the serving base station may be referred to as the serving cell. The base stations that are in the vicinity of the serving base station are called Neighbor Base Stations (NBS). Similarly, in some wireless communication systems a neighbor base station may be referred to as a neighbor cell.

A client device, after initially synchronizing with a cell, may switch to another cell depending on the signal conditions, network congestion, and other criteria. The process of switching from one cell to another cell by a client device is often referred to as handover (HO) or cell reselection. In some wireless communication systems handover is also referred to as handoff. Also in some wireless communication systems cell reselection is also referred to as idle mode handoff. An NBS, to which a client device may be switching over its communication from the current SBS, is herein referred to as Target Base Station (TBS). In some wireless communication systems, a target base station is normally referred to as a target cell. Sometimes, during a handover, the serving cell and the target cell may be the same and only the channel used for communication may be changed. Such a handover, in which the cell is not changed, is called as an intra-cell handover. The purpose of intra-cell handover may be that the new channel is better suited for communication than the previous channel within the same cell. Cell reselections or handovers amongst cells that use the same frequency are referred herein as intra-frequency cell reselection or handover. Cell reselections or handovers amongst cells that use different frequencies are referred herein as intra-frequency cell reselection or handover. A network may use different Radio Access Technologies (RATs) for providing various services. In a particular network, the cells of different RAT types may be overlapping or adjacent to each other. If a neighbor cell is using a RAT type that is different from the RAT type used by the serving cell, it is referred to as an inter-RAT neighbor cell.

The decision making process for handovers and cell reselections varies from one wireless communication system to another. However, the decisions are generally based on the signal conditions measurements by the client devices and reporting of those measurements to the wireless communication network by the client devices. The wireless communication network generally may influence and control the measurements and reporting process of the client device by providing parameters for the measurement and reporting process. The actual decision to perform handover may be made either by the wireless communication network or by the client device depending on the type of particular wireless communication system. On the other hand the cell reselection decisions in idle mode (i.e., when client device is not in active communication with the wireless communication network) may be generally performed autonomously by the client device. Both handovers and cell reselections may normally lead to change of cell from which the client device may access communication services. The difference between the handover procedure and cell reselection procedure may depend generally on whether a client device is engaged in an active communication with the wireless communication network. The measurements may include the Received Signal Strength Indicator (RRSI), Signal-to-Noise and Interference Ratio (SINR), the physical identities of one or more cells that may be visible or detectable by a client device, the difference between the timing of the current cell on which a client device may be camped and the timing of the neighbor cells. For example, in case of 3GPP LTE, the measurements may include Reference Signal Received Power (RSRP), Reference Signal Received Quality (RSRQ), Physical Cell Identity (PCI), etc.

In idle mode, a client device for the most part may turn off a majority of its circuitry to reduce power consumption. This is often referred to as "sleep" state, a sub-state within the idle mode. A client device may remain in a sleep state for a long duration and may wake up at the desired time window where it expects to receive the paging messages and certain SIB s. This alternating sequence of sleep and wake-up in idle mode is referred herein as Discontinuous Reception (DRX). The sleep and wake-up sequence may follow regular pattern and its period is often referred to as DRX cycle. The success rate for the incoming calls (e.g., mobile terminated voice calls and/or data calls) in a client device is directly related to the successful reception of paging messages. Normally, in idle mode, in addition to the reception of paging messages and SIB messages, a client device may continue to search and monitor neighbor cells. In connected mode, a client device may be actively engaged in communication with the network for data transfer in downlink, uplink, or both directions.

When a client device attempts to perform a network registration procedure to get service from a cell, it first decodes the system information broadcast in the cell. The client device may store such system information. The system information carries important information regarding the cell reselection criteria. Such information may include but not limited to the Tracking Area Identity (TAI), Public Land Mobile Network Identity (PLMN ID) which uniquely identifies a particular network operator, Closed Subscriber Group Identity (CSG ID), RAT type, neighbor cell frequencies, etc. This information may help to decide whether a cell is a "suitable cell" for the client device to avail all the services offered by it, or the cell is an "acceptable cell" where the client device may avail only limited services such as emergency calls. The client device may have to perform the network registration procedure to get service from the network and for the network to be able to page the client device for mobile terminated (incoming) calls. The network registration procedure may be typically performed by a client device with a particular cell. A group of cells in the geographic vicinity of each other may form a registration area. A registration area may be identified based on the system information of a cell. For example, the tracking area of a group of cells in a registration area may be the same.

Each base station in a wireless communication network may be identified by a unique identifier referred to herein as Cell Identity (CID). The CID of a base station may become known to a client device when it decodes SI from the base station. To avoid unnecessary updates from a client device and yet ensure the ability to reach a client device at any given time, the network may organize a group of cells into a "tracking area" and use a TAI to identify the various groups of cells. This is shown in FIG. 2 where four different tracking areas are illustrated. A cell may broadcast information about the tracking area it belongs to by including the TAI information in the system information. A client device may be required to inform the network when it begins to receive service from a cell that belongs to a tracking area that is different from the tracking area of the cells from which it was previously receiving service. The process of informing the network that the client device has begun receiving service from a cell that belongs to a new tracking area is referred herein as Tracking Area Update (TAU) procedure. With this method, a client device may perform TAU only when there is a change in TAI of the cell from which it is getting service. For example, in FIG. 2, when a client device reselects from the cell with CID=1003 to the cell with CID=1007 which has the same TAI, it may not perform TAU procedure. However, when the client device reselects from the cell with CID=1007 and TAI=200 to the cell with CID=1012 and TAI=201, it may perform TAU procedure.

Different client devices may be identified using their respective unique identities. For example, International Mobile Subscriber Identity (IMSI), Temporary Mobile Subscriber Identity (TMSI), the Media Access Control (MAC) address, the Internet Protocol (IP) address may be used for the identity. Regardless of any particular identity used, it is generically referred herein as Client Device Identity (CDI).

As long as a client device is in the same registration area, the client device may not perform network registration procedure again except that a periodic network registration update procedure may need to be performed even if the client device continues to be stationary or move within the same registration area. If the client device moves to a cell which does not belong to the registration area in which the client device is registered, then the client device may perform network registration procedure to continue to access service from the network. Similarly, as long as a client device is in the same TAI, the client device may not perform TAU procedure again except that a periodic TAU procedure may need to be performed even if the client device continues to be stationary or move within the same TAI.

A client device may use internet service from one or more of the available internet service sources. A client device may access the internet service directly through one of the primary sources of internet service as mentioned earlier. Alternatively, a client device may access the internet service through a local network, which may perform distribution of the primary internet service to the users localized in a given area. Examples of such local networks include Local Area Network (LAN) using Ethernet, Wireless LAN (WLAN) commonly known as Wi-Fi, Bluetooth™, Zigbee or some other local area networking schemes. The wireless local networking schemes are collectively referred herein as Short Range Wireless Link (SRWL). The wire-line local networking schemes, such as Ethernet, are referred herein as Short Range Cabled Link (SRCL). Both the SRWL and SRCL together are referred to as Short Range Link (SRL). When a client device is in proximity of a location where an SRL access is available, it may access the internet service using the SRL.

The local area where WLAN service is available is often referred to as a Hotspot. The device that offers the WLAN service in a given local area is referred to as an Access Point (AP). In the present disclosure, the terms Hotspot AP or Hotspot are used interchangeably to refer to the device that offers the WLAN service in a given local area. As the variety of client devices has increased and the demand for MB service has increased, a device known as a mobile Hotspot is commonly used. A mobile Hotspot device includes both a modem for WWAN and a WLAN AP (Hotspot AP) to distribute the internet service to local client devices. FIG. 3 illustrates an example scenario of client devices accessing the internet 314 using the mobile Hotspot 302 which includes the WWAN modem 304 and WLAN Access Point 306. The client devices smartphone 308 and tablet 310 connect to the WLAN Access Point 306 over the WLAN SRWL 312. The WLAN Access Point 306 is connected to the WWAN modem 304 which is in turn connected to a WWAN 316 using the communication link 320. The client device smartphone 308 may maintain communication link 318 with the WWAN even when it is receiving internet service from mobile Hotspot 302. The client device tablet 310 which may not have WWAN modem maintains only the SRWL 312 with the mobile Hotspot 302.

FIG. 4 illustrates the block diagram of an example mobile Hotspot device. As shown in FIG. 4, for the chosen example, the WWAN modem and the WLAN AP may be connected to each other via one of the standard interfaces used in the industry such as Universal Serial Bus (USB), Secure Digital Input Output (SDIO), or proprietary interfaces. In another mobile Hotspot example, the WWAN modem and the WLAN AP may be an Integrated Circuit (IC) as shown in FIG. 5.

When a client device is connected to an SRWL such as the WLAN for internet service, it may continue to maintain its link with the WWAN for services other than internet service. This is shown by communication link 318 between smartphone 308 and WWAN 316. For example, a voice call or a video call to or from the phone number associated with the client device may be enabled through the WWAN while the internet service may be accessed through WLAN. The maintenance of the link with the WWAN may not necessarily require an active connection (a call or an internet service), but it may involve a number of procedures that a client device may need to perform. A client device may need to continue to receive paging messages from the WWAN in order to receive any incoming voice or video calls. A client device may need to perform measurements on SBS and NBSs as well as decode the SI from the SBS and some of the NBSs. A client device may need to perform TAU procedure with the WWAN whenever it reselects to a neighbor cell with a TAI different from a TAI of its current serving cell. A client device may need to perform registration procedure with the WWAN when it reselects to a cell in a different registration area or when a periodic registration update is required. Collectively, all the procedures performed by a client device in idle mode with WWAN are referred to as idle Radio Resource Management (RRM) procedures. In FIG. 3, the link 318 between the WWAN modem of a client device smartphone 308 and the WWAN 316 is maintained for the purposes mentioned above, even when the client device is getting internet service from the WLAN.

SUMMARY

A method and apparatus are disclosed that enable a mobile Hotspot to perform TAU procedure on behalf of client devices with WWAN capability that are connected to it over an SRWL. This in turn may enable client devices with WWAN capability to keep their own WWAN modem in low power mode and reduce power consumption.

In accordance with an aspect of the present disclosure, a method for performing a Tracking Area Update (TAU) for a client device having Wireless Wide Area Network (WWAN) capability through a mobile Hotspot device connectable to the client device over a Short Range Wireless Link (SRWL), may include: controlling, by a processing device at the client device, transmitting WWAN modem capability and current status information of the client device to the mobile Hotspot device, in response to a request from the mobile Hotspot device; receiving, from the mobile Hotspot device, a message indicating the TAU procedure for the client device is performable at the mobile Hotspot device, wherein the message is based on a determination at the mobile Hotspot device whether a WWAN modem of the mobile Hotspot device and a WWAN modem of the client device are camped on a same WWAN; determining whether to accept an offer from the mobile Hotspot device to perform the TAU procedure for the client device; when the offer is determined not to be accepted, transmitting a second message to the mobile Hotspot device rejecting the offer; and when the offer is determined to be accepted, transmitting a third message to the mobile Hotspot device accepting the offer and required credentials for the mobile Hotspot device to perform the TAU for the client device.

In one alternative, the message may be based on a determination at the mobile Hotspot device whether the WWAN modem of the mobile Hotspot device and the WWAN modem of the at least one first client device are camped on a same Radio Access Technology (RAT), a same Tracking Area Identity (TAI) and a same cell.

In one alternative, the method may include controlling, by the processing device, receiving over the SRWL, from the mobile Hotspot device, a TAU procedure WWAN response message received at the mobile Hotspot device from a given WWAN to a respective given client device.

In one alternative, the method may include controlling, by the processing device, when a message is received from the mobile Hotspot device over the SRWL indicating the TAU procedure for the client device failed at the mobile Hotspot device, determining TAU action according to a procedure of a Radio Access Technology (RAT) for a given WWAN on which the client device is camped, or transmitting a request to the mobile Hotspot device to perform the TAU procedure for the client device, after elapse of a predetermined time.

In one alternative, the method may include controlling, by the processing device, transmitting a response signal to the mobile Hotspot device indicating agreement whether to be informed by the mobile Hotspot device only in case of a failure in performing the TAU procedure therefor and not notified in case of success in performing the TAU procedure.

In one alternative, the method may include controlling, by the processing device, receiving a notification from the mobile Hotspot device in case of the failure in performing the TAU procedure therefor.

In one alternative, the method may include controlling, by the processing device, when the WWAN modem of the mobile Hotspot device and the WWAN modem of the client device are determined to be camped on first and second cells of the same WWAN and have different Tracking Area Identities (TAIs), receiving from the mobile Hotspot device a fourth message indicating that the TAU procedure for the client device is performable at the mobile Hotspot device in a case the client device agrees to update the mobile Hotspot device about any cell reselection to a cell belonging to a new TAI different from a previous TAI.

In one alternative, the method may include controlling, by the processing device, accepting an offer from the mobile Hotspot to perform the TAU for the client device and updating the mobile Hotspot device when the client device reselects to the cell belonging to the new TAI different from the previous TAI.

In one alternative, the method may include controlling, by the processing device, when the WWAN modem of the mobile Hotspot device and the WWAN modem of the client device are determined by the mobile Hotspot device to be camped respectively on first and second cells of the same WWAN and have different first and second Radio Access Technologies (RATs), receiving a fourth message from the mobile Hotspot device indicating that the TAU procedure for the client device is performable at the mobile Hotspot device in a case the client device agrees to update the mobile Hotspot device about any cell reselection to a cell belonging to a TAI different from a previous TAI and in the second RAT.

In one alternative, the method may include controlling, by the processing device, accepting an offer from the mobile Hotspot device for the mobile Hotspot device to perform the TAU for the client device and updating the mobile Hotspot device when the client device reselects to the cell having the TAI different from the previous TAI and in the second RAT.

In one alternative, the client device may be on the same WWAN or a different WWAN on which the WWAN modem of the mobile Hotspot device is camped.

In one alternative, the method may include controlling, by the processing device, communication with the mobile Hotspot device to indicate agreement for the mobile Hotspot device to perform only a periodic TAU procedure for the client device.

In one alternative, the method may include controlling, by the processing device, communication with the mobile Hotspot device to indicate agreement for the mobile Hotspot device to perform for the client device (i) a periodic TAU procedure and (ii) a second TAU procedure when the WWAN modem of the client device camps on a given cell having a TAI different from a TAI of a last cell on which the client device was camped.

In one alternative, the method may include controlling, by the processing device, when the second TAU procedure is performed, updating a status of the WWAN modem of the client device when the client device camps on the given cell having the TAI different from the TAI of the last cell on which the client device was camped.

In accordance with an aspect of the present disclosure, an apparatus may perform a Tracking Area Update (TAU) for a client device having Wireless Wide Area Network (WWAN) capability through a mobile Hotspot device connectable to the client device over a Short Range Wireless Link (SRWL), where the apparatus may include circuitry configured to control at the client device, transmitting WWAN modem capability and current status information of the client device to the mobile Hotspot device, in response to a request from the mobile Hotspot device; receiving, from the mobile Hotspot device, a message indicating the TAU procedure for the client device is performable at the mobile Hotspot device, wherein the message is based on a determination at the mobile Hotspot device whether a WWAN modem of the mobile Hotspot device and a WWAN modem of the client device are camped on a same WWAN; determining whether to accept an offer from the mobile Hotspot device to perform the TAU procedure for the client device; when the offer is determined not to be accepted, transmitting a second message to the mobile Hotspot device rejecting the offer; and when the offer is determined to be accepted, transmitting a third message to the mobile Hotspot device accepting the offer and required credentials for the mobile Hotspot device to perform the TAU for the client device.

In one alternative of the apparatus, the message may be based on a determination at the mobile Hotspot device whether the WWAN modem of the mobile Hotspot device and the WWAN modem of the at least one first client device are camped on a same Radio Access Technology (RAT), a same Tracking Area Identity (TAI) and a same cell.

In one alternative of the apparatus, the circuitry may be configured to control receiving over the SRWL, from the mobile Hotspot device, a TAU procedure WWAN response message received at the mobile Hotspot device from a given WWAN to a respective given client device.

In one alternative of the apparatus, the circuitry may be configured to control, when a message is received from the mobile Hotspot device over the SRWL indicating the TAU procedure for the client device failed at the mobile Hotspot device, determining TAU action according to a procedure of a Radio Access Technology (RAT) for a given WWAN on which the client device is camped, or transmitting a request to the mobile Hotspot device to perform the TAU procedure for the client device, after elapse of a predetermined time.

In one alternative of the apparatus, the circuitry may be configured to control transmitting a response signal to the mobile Hotspot device indicating agreement whether to be informed by the mobile Hotspot device only in case of a failure in performing the TAU procedure therefor and not notified in case of success in performing the TAU procedure.

In accordance with an aspect of the present disclosure, a wireless communication device may include a receiver to receive a wireless communication; and a processing device configured for performing a Tracking Area Update (TAU) for the wireless communication device as a client device having Wireless Wide Area Network (WWAN) capability through a mobile Hotspot device connectable to the client device over a Short Range Wireless Link (SRWL). The processing device may be configured to control: transmitting WWAN modem capability and current status information of the client device to the mobile Hotspot device, in response to a request from the mobile Hotspot device; receiving, from the mobile Hotspot device, a message indicating the TAU procedure for the client device is performable at the mobile Hotspot device, wherein the message is based on a determination at the mobile Hotspot device whether a WWAN modem of the mobile Hotspot device and a WWAN modem of the client device are camped on a same WWAN; determining whether to accept an offer from the mobile Hotspot device to perform the TAU procedure for the client device; when the offer is determined not to be accepted, transmitting a second message to the mobile Hotspot device rejecting the offer; and when the offer is determined to be accepted, transmitting a third message to the mobile Hotspot device accepting the offer and required credentials for the mobile Hotspot device to perform the TAU for the client device.

BRIEF DESCRIPTION OF THE DRAWINGS

FIG. 5 illustrates a high-level block diagram of an example mobile Hotspot device with an integrated mobile broadband modem and WLAN Access Point (AP).

FIG. 6 illustrates an example of a composite message for TAU procedure for multiple client devices camped on the same Wireless Wide Area Network (WWAN) as that of the mobile Hotspot according to an aspect of the present disclosure.

FIG. 9 illustrates an example of a multi-client tunneled message for TAU procedure for some client devices camped on the same WWAN as that of the mobile Hotspot and some other client devices camped on WWANs different from that of the mobile Hotspot according to an aspect of the present disclosure.

DETAILED DESCRIPTION

Figure 1:
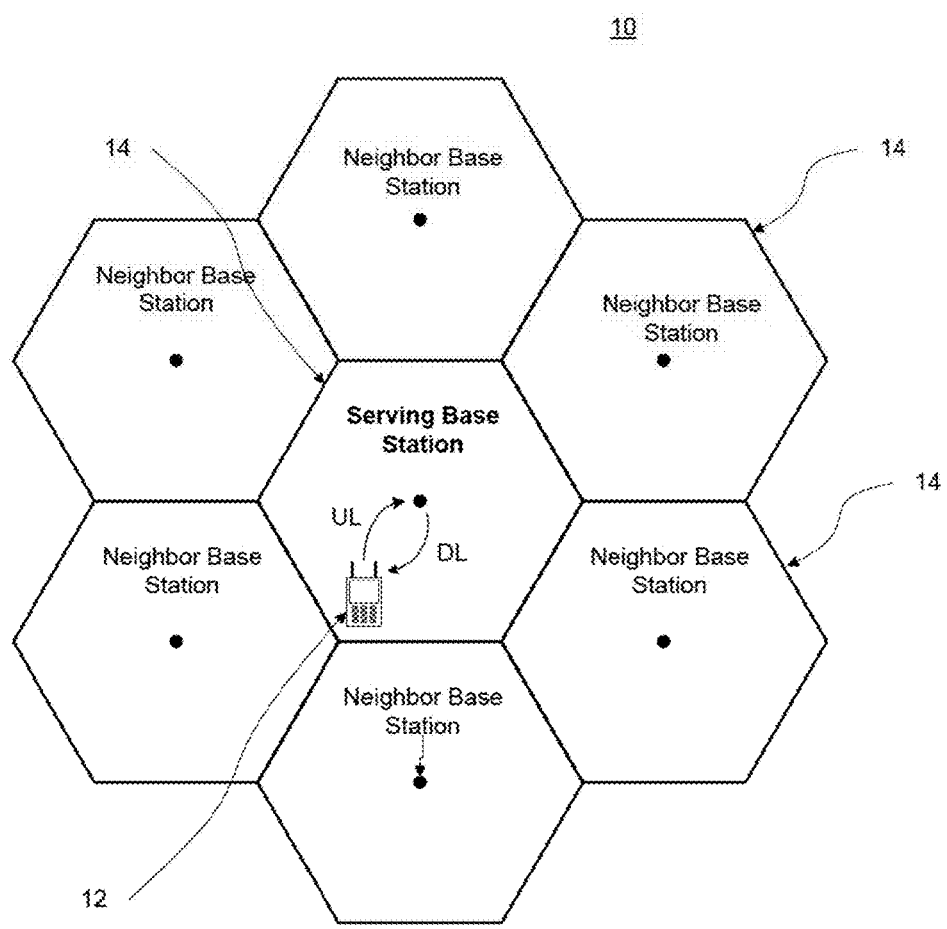
FIG. 1 illustrates a conventional mobile wireless communication system.
Figure 2:
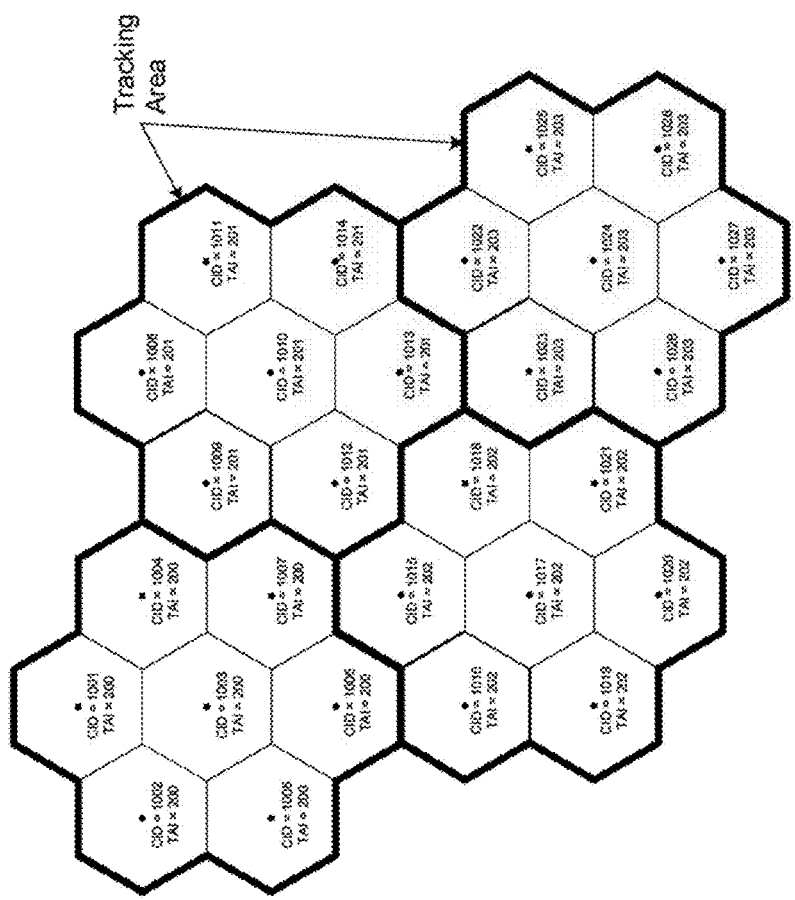
FIG. 2 illustrates the grouping of cells into tracking areas in a wireless communication system.

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the appended drawings, specific terminology will be used for the sake of clarity. However, the present disclosure is not intended to be limited to the specific terms used.

Although aspects of the present disclosure are illustrated using a particular type of client devices and communication networks, the present disclosure is applicable to any type of client devices and communications networks some of which are mentioned in an earlier section in the present disclosure.

The mobile Hotspot may be configured to receive mobile broadband service from one or more WWANs. For example, this may be configured by the contents of the one or more SIMs that may be part of the mobile Hotspot. Some of the client devices that receive internet service from the mobile Hotspot may be connected to one or more WWANs based on one or more SIMs that may be part of the client device. It may be possible that the SIM of the WWAN modem in the mobile Hotspot and the SIM of the WWAN modem in the client device are configured to operate on the WWAN of the same network operator. Therefore, both the WWAN modems may be camped on the same cells of the same WWAN since the client device and the mobile Hotspot are likely to be in vicinity of each other in order to connect over the SRL. In another scenario, it may be possible that the one or more SIMs of the WWAN modem in the mobile Hotspot and the SIM of the WWAN modem in the client device are configured to operate on the WWANs of different network operators. Therefore, the two WWAN modems may be camped on different WWANs in the same geographic area.

Normally both the WWAN modem in the mobile Hotspot and the WWAN modem in the client device may perform their RRM procedures independently. For example, both the WWAN modems may perform their own TAU procedures with their respective WWANs according to the parameters of the respective networks.

According to an aspect of the present disclosure, a mobile Hotspot may perform the TAU procedure on behalf of the one or more client devices with WWAN capability that may be connected to it over SRWL. According to an aspect of the present disclosure, the mobile Hotspot may request client devices with WWAN capability to send their WWAN modem capabilities and current status. For example, the WWAN modem capability may include the supported RATs, supported frequency bands, identity of allowed WWAN operators from the SIMs, etc. The current status may include the CID of the particular cell and the RAT on which the WWAN modem may be camped on. According to an aspect of the present disclosure, after receiving the WWAN modem capabilities and current status from a client device, the mobile Hotspot may make a determination about whether its own WWAN modem and the WWAN modem of the client device are camped on the same WWAN and if so whether they are camped on the same RAT, the same TAI and the same cell. According to an aspect of the present disclosure, if the mobile Hotspot determines that its WWAN modem and the WWAN modem of the client device are camped on the cells of the same WWAN with the same TAI, the mobile Hotspot may send a message to the client device indicating that the TAU procedures for the client device may be performed by the mobile Hotspot. Note that although the WWAN modem of the mobile Hotspot and the WWAN modem of the client device may be camped on the same cell or they may be camped on different cells but with the same TAI within the same WWAN.

According to an aspect of the present disclosure, the client device may or may not accept the offer from the mobile Hotspot to perform the TAU procedures on behalf of the client device. According to an aspect of the present disclosure, if the client device determines not to allow the mobile Hotspot to perform the TAU on its behalf, it may send a message to the mobile Hotspot rejecting the offer to perform TAU procedure on its behalf. According to an aspect of the present disclosure, if the client device determines to allow the mobile Hotspot to perform the TAU on its behalf, it may send a message to the mobile Hotspot accepting the offer to perform TAU procedure on its behalf and provide all the required credentials such as the IMSI, etc. for the mobile Hotspot to perform the TAU on behalf of the client device.

According to an aspect of the present disclosure, the mobile Hotspot, upon reception of the message from client device accepting the offer to perform the TAU on behalf of the client device may save the client device's credentials into its local memory. According to an aspect of the present disclosure, whenever the mobile Hotspot performs TAU procedure for its own WWAN modem, it may include the credentials for the one or more client devices that may have agreed to allow the mobile Hotspot to perform TAU on their behalf. According to an aspect of the present disclosure, during the TAU procedure, the WWAN modem in the mobile Hotspot may send a single composite message containing the credentials for the mobile Hotspot WWAN modem and all the client devices that may have agreed to allow the mobile Hotspot to perform TAU on their behalf. According to an aspect of the present disclosure, a new message for TAU procedure with Information Element (IE) records for multiple client devices may be defined and used by the WWAN and the mobile Hotspot for supporting TAU procedure using a single composite message. An example of a TAU procedure composite message with TAU request for multiple client devices is illustrated in FIG. 6. This composite message for TAU procedure may be used for client devices that belong to the same or different TAIs but belong to the same RAT of the same WWAN. According to an aspect of the present disclosure, during the TAU procedure, the WWAN modem in the mobile Hotspot may send multiple messages containing the credentials for subset of the client device WWAN modems or credentials for a single client device WWAN modem. The WWAN may respond to the TAU procedure related messages from the WWAN modem of the mobile Hotspot as per the normal operation specified by the respective 3GPP and other standards. The WWAN may send a single composite response message or multiple response messages corresponding to TAU procedure request for multiple client devices and the mobile Hotspot. According to an aspect of the present disclosure, upon reception of the one or more TAU procedure response messages from the WWAN, the mobile Hotspot may forward the WWAN response messages to the respective client devices over the SRWL.

According to an aspect of the present disclosure, the TAU procedure for some client devices may be successful and for some other client devices may result in failure. According to an aspect of the present disclosure, in case the TAU procedure fails for a particular client device, the further steps to be taken may be determined by the client devices as per the procedure specified by the standard for the RAT on which the client device may be camped. According to an aspect of the present disclosure, when a TAU procedure fails for a particular client device, the mobile Hotspot may stop performing further TAU procedures on behalf of that particular client device until that client device requests the mobile Hotspot to start performing the TAU procedure on behalf of that client device again.

According to an aspect of the present disclosure, the mobile Hotspot may offer the option, to the client devices that have agreed to allow the mobile Hotspot to perform TAU procedure on their behalf, to inform the client devices only in case of any failures in the TAU procedures and not notify in case of normal successful TAU procedure. This may enable the client devices to not have to receive and acknowledge any TAU procedure related update from the mobile Hotspot.

According to an aspect of the present disclosure, if the mobile Hotspot determines that its WWAN modem and the WWAN modem of the client device are camped on the cells of the same WWAN but with different TAIs, the mobile Hotspot may send a message to the client device indicating that the TAU procedures for the client device may be performed by the mobile Hotspot if the client device agrees to update the mobile Hotspot about any cell reselection it may do to a cell belonging to a TAI that is different from its previous TAI. According to an aspect of the present disclosure, the client device may accept the offer to allow the mobile Hotspot to perform TAU on its behalf and agree to update the mobile Hotspot whenever it reselects to a cell that has TAI different from the TAI of the cell on which client device was most recently camped. According to an aspect of the present disclosure, the mobile Hotspot may perform the TAU procedure for its own WWAN modem and the TAU procedure on behalf of the client device at the same time or at different time instances. According to an aspect of the present disclosure, if the TAU procedures for the WWAN modem of the mobile Hotspot and on behalf of the client device are done at the same time, they may be performed using a single composite message or separate messages. According to an aspect of the present disclosure, the determination of whether the TAU procedure for the WWAN modem of the mobile Hotspot and on behalf of the client devices may be done at the same time or not may be a configurable option. The configuration may depend on the capabilities and permissions from the WWAN operator.

A mobile Hotspot may be camped on one RAT whereas a client device may be camped on another RAT of the same WWAN. For example, the WWAN modem of the mobile Hotspot may be camped on a 3GPP LTE RAT and the client device may be camped on a 3GPP UMTS RAT. According to an aspect of the present disclosure, if the mobile Hotspot determines that its WWAN modem and the WWAN modem of the client device are camped on the cells of the same WWAN but with different RATs, the mobile Hotspot may send a message to the client device indicating that the TAU procedures for the client device may be performed by the mobile Hotspot if the client device agrees to update the mobile Hotspot about any cell reselection it may do to a cell belonging to a TAI that is different from its previous TAI in its respective RAT. According to an aspect of the present disclosure, the client device may accept the offer to allow the mobile Hotspot to perform TAU on its behalf and agree to update the mobile Hotspot whenever it reselects to a cell that has TAI different from the TAI of the cell on which client device was most recently camped in its respective RAT. According to an aspect of the present disclosure, the mobile Hotspot may perform the TAU procedure for its own WWAN modem and the TAU procedure on behalf of the client device at different time instances.

Figure 7:
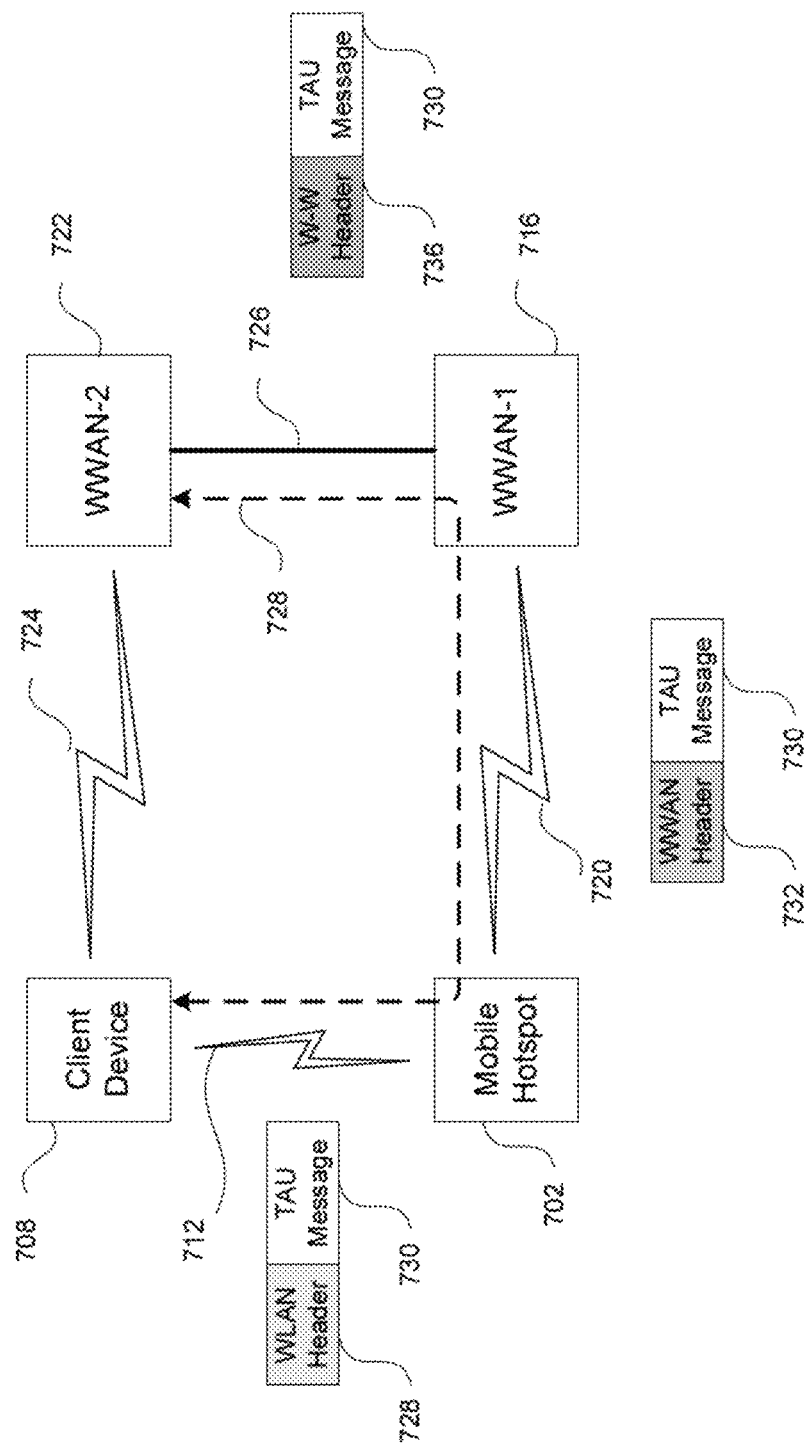
FIG. 7 illustrates a block diagram and data packet flow for the tunneled mode of operation for performing TAU procedure by a mobile Hotspot on behalf of client device according to the aspects of the present disclosure.

A tunneling protocol allows a network to provide a network service that the underlying network does not support or provide directly. One important use of a tunneling protocol is to allow a foreign protocol to run over a network that does not support that particular protocol, for example, running IPv6 over IPv4 network. According to an aspect of the present disclosure, when the WWAN modem of the client devices and the WWAN modem of the mobile Hotspot are camped on WWANs of different operators or different RAT, the mobile Hotspot may perform the TAU procedure for the client devices using the tunneling of the TAU procedure messages for the client device through its own WWAN modem for the WWAN on which it may be camped. According to an aspect of the present disclosure, the tunneled message may include the PLMN ID, CID, frequency of operation, etc. and the client device credentials such as IMSI, etc. required for the TAU procedure with the WWAN on which the client device may be camped. The WWAN modem of the mobile Hotspot may act as a data pipe to transport the TAU procedure messages for the client devices for their respective WWANs. The tunneling of TAU procedure messages for this mode of operation is illustrated in FIG. 7. The WWAN modem of the mobile Hotspot 702 is camped on the WWAN-1 716 over the wireless link 720. The client device 708 is connected to the mobile Hotspot 702 over the SRWL 712. The WWAN modem of the client device 708 is camped on the WWAN-2 722 over the wireless link 724. The client device 708 may first communicate the required messages for TAU procedure with the WWAN-2 722 to the mobile Hotspot 702 over the SRWL 712 by tunneling.

Figure 8:
FIG. 8 illustrates an example of a tunneled message for TAU procedure for multiple client devices camped on WWANs different from that of the mobile Hotspot according to an aspect of the present disclosure.

According to an aspect of the present disclosure, a new message for TAU procedure with IE records for multiple client devices may be defined and used by the WWAN and the mobile Hotspot for supporting tunneled mode TAU procedure for client devices connected to WWANs different from the WWAN of the mobile Hotspot WWAN modem. An example of a tunneled mode TAU procedure with TAU procedure request for multiple client devices in multiple different WWANs is illustrated in FIG. 8. This message for tunneled TAU procedure may be used for client devices that belong to different WWANs.

According to an aspect of the present disclosure, the TAU procedure for the three types of devices may be performed simultaneously:

a) WWAN modem of the mobile hotspot.
b) Client devices connected to mobile Hotspot and connected to the same WWAN as the mobile hotspot.
c) Client devices connected to mobile Hotspot and connected to WWANs different from that of the mobile hotspot.

The combined TAU procedure for the disparate types of client devices and mobile Hotspot may be performed simultaneously using the combined multi-client tunneled mode TAU procedure message as illustrated in FIG. 9. As shown in FIG. 9, the first part of the TAU procedure message in FIG. 9 may be used for the mobile Hotspot and the client devices connected to the same WWAN and the latter part of the TAU procedure message may be used for client devices connected to WWANs different from that of the mobile Hotspot.

The data packet with the TAU message may include the WLAN header 728 and the TAU message 730. Note that although the TAU message 730 is intended for WWAN-2, it is transmitted over the SRWL 712 by tunneling, i.e., encapsulating the TAU message 730 with the WLAN header 728. When a TAU procedure for the client device 708 needs to be performed, the mobile Hotspot 702 may use the previously received TAU procedure messages from the client device 708 and encapsulate them with the required headers and other information for communicating with the WWAN-1 716 over the WWAN-1 communication link 720. The data packet with the TAU message may include the WWAN header 732 and the TAU message 730 which is the same exact message received initially from the client device 708. Again, note that although the TAU message 730 is intended for WWAN-2, it is transmitted over the WWAN-1 link 720 by tunneling, i.e., encapsulating the TAU message 730 with the WWAN-1 header 732. When the WWAN-1 716 receives the encapsulated message from the mobile Hotspot 702, from the header of the received message it may recognize that it includes the TAU procedure message for WWAN-2 722. At this point the WWAN-1 uses the received tunneled message from the mobile Hotspot 702 and prepares a message to be sent to the WWAN-2 722 over the communication link 726 connecting the two WWANs. The data packet with the TAU message may include the WWAN-to-WWAN (W-W) header 736 and the TAU message 730. Note that the communication link 726 may exist between two WWANs for various other normal purposes such as when client device camped on one WWAN may initiate a voice call with another client device that may be camped on to another WWAN. The communication link 726 may be a wired communication link, an optical fiber communication link, a microwave link, a satellite link, etc. The WWAN-2 722 may respond to the TAU procedure message from the client device 708 as per the standard for the RAT on which the client device may be camped. Any response message from the WWAN-2 722 may be tunneled back to the client device 708 in a similar manner as for the case of TAU messages from client device to the WWAN2.

According to an aspect of the present disclosure, some of the client devices may be on the same WWAN as the mobile Hotspot and some client devices may be on different WWANs. According to an aspect of the present disclosure, the mobile Hotspot may simultaneously support performing TAU procedure on behalf of client devices in both the tunneled and non-tunneled modes.

Typically there are two types of TAU procedures. One is called periodic TAU procedure which may be performed periodically as per configured duration of time. Another type TAU procedure is performed whenever the WWAN modem camps on a cell whose TAI is different from the TAI of the last cell on which it was camped. According to an aspect of the present disclosure, the mobile Hotspot and client device may agree to allow the mobile Hotspot to perform only the periodic TAU procedure on behalf of the client device. According to an aspect of the present disclosure, the mobile Hotspot and client device may agree to allow the mobile Hotspot to perform both types of TAU procedure on behalf of the client device. In such a case, according to an aspect of the present disclosure, the client device may update the status of its WWAN modem whenever it camps on a cell whose TAI is different from the cell on which it was previously camped. Typically in a given WWAN, the periodic TAU timer is configured to be the same for all the client devices that are connected or registered to the WWAN. But depending on when each client device does its first or most recent registration the time instance in which the client devices are expected to the next periodic TAU varies. According to an aspect of the present disclosure, whenever a new client device gets connected to the mobile hotspot, the mobile hotspot may align the periodic TAU procedure of the newly added client device with the other client device(s) periodic TAU. This is for the mobile hotspot to combine all the client device periodic TAU in a single TAU message.

According to an aspect the present disclosure, for the client device that are camped on to the same WWAN and to the same TAI as that of the mobile hotspot device, the mobile hotspot may perform one time combined TAU with all the client TAU records and from there on, the mobile hotspot device may perform normal TAU with an additional field "client connection status" set to "No Change," which indicates to the WWAN that the previously sent client device list in the TAU message is still valid. The mobile hotspot device may perform this normal TAU procedure with the WWAN if there is no change in the client devices connected with the mobile Hotspot and there is no change in the client device cell camp on status since the last TAU procedure.

The WWAN modem in a client device may camp on different WWANs from different operators depending on signal conditions, roaming agreements, location, and movement of the client device. Therefore, the client device and the mobile Hotspot may be camped on the same or different WWAN at different time instances. Therefore, according to an aspect of the present disclosure, the mobile Hotspot may switch from the tunneled mode to non-tunneled mode and vice versa for performing the TAU procedures with the WWAN on behalf of the client devices.

Figure 3:
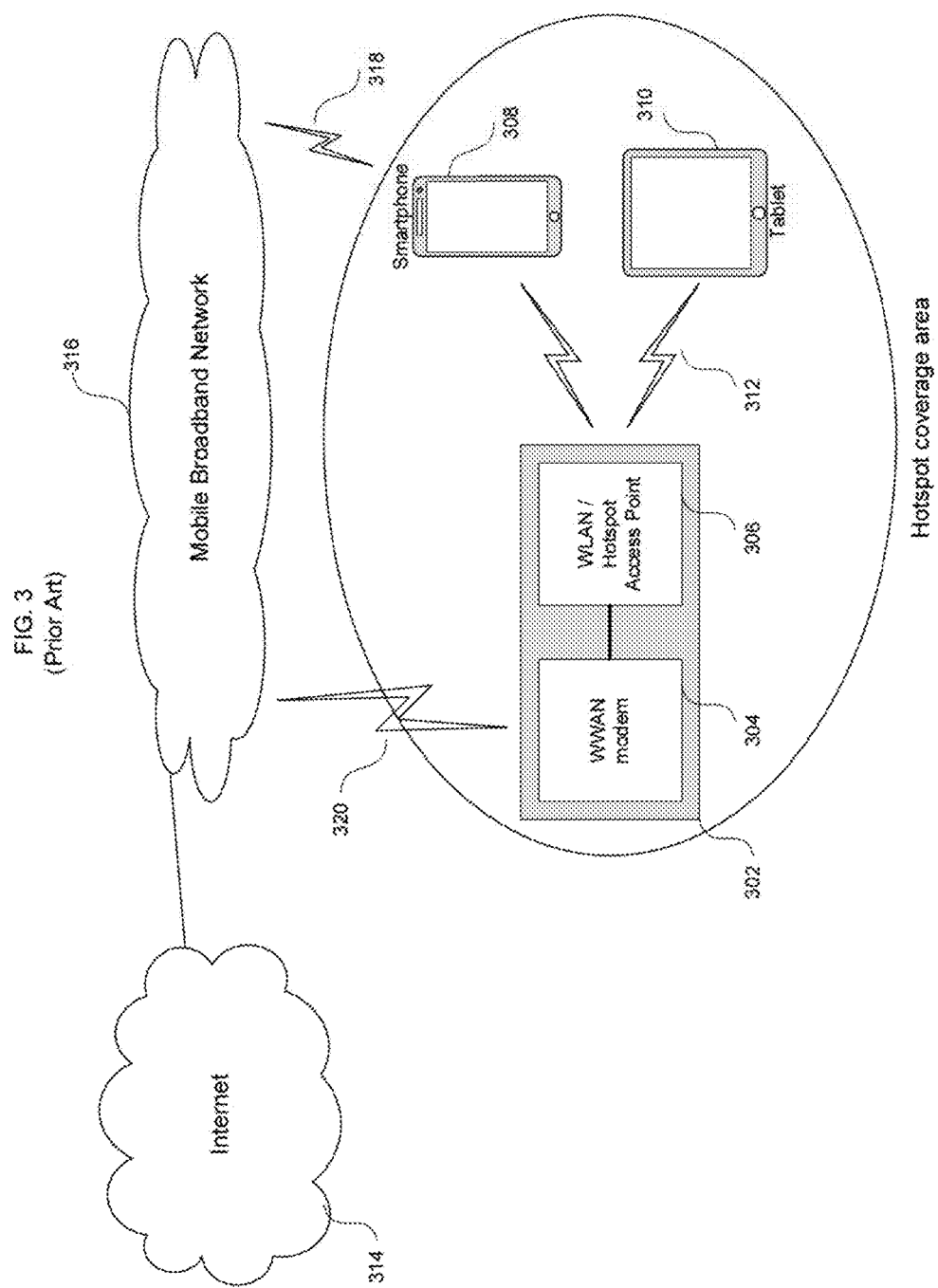
FIG. 3 illustrates an example scenario of internet access using Wireless Local Area Network (WLAN) from a mobile Hotspot.
Figure 4:
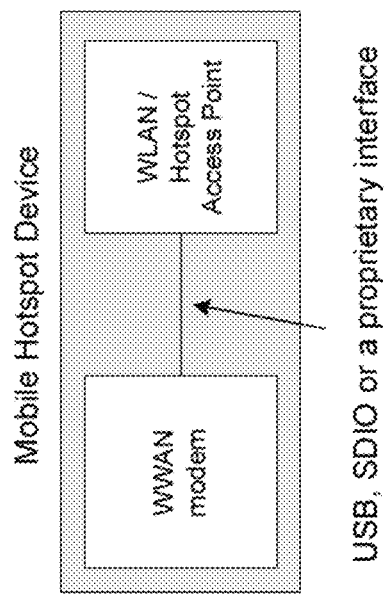
FIG. 4 illustrates a high-level block diagram of an example mobile Hotspot device.

By way of example only, the above-described method for enabling a mobile Hotspot to perform TAU procedure on behalf of a client device may be implemented in a client device such as a client device 308 in FIG. 3.

Figure 10:
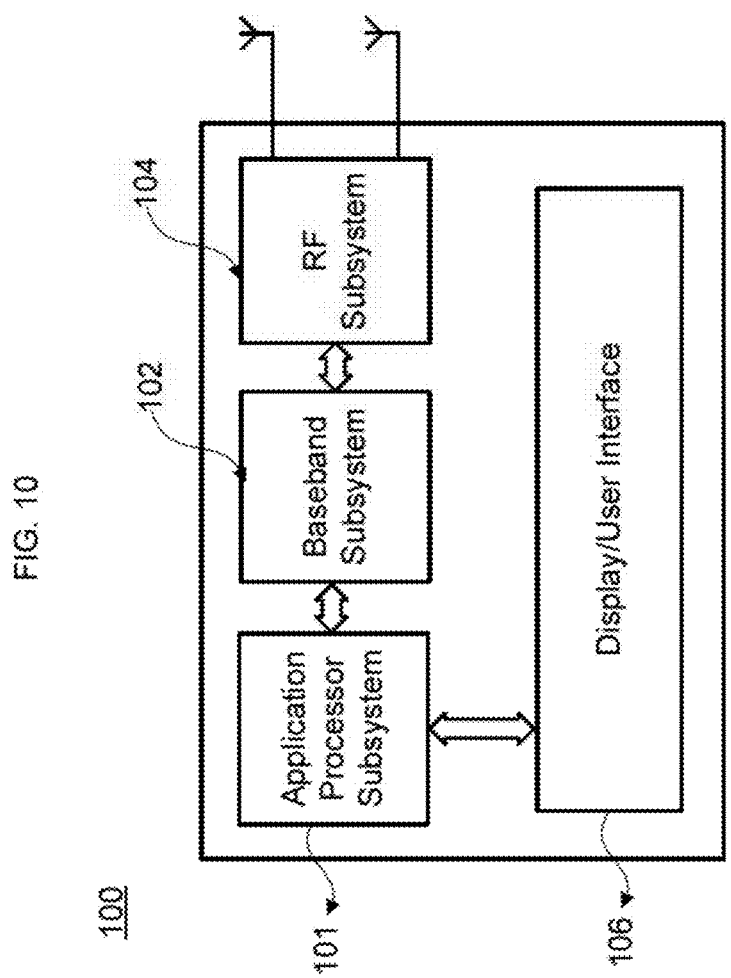
FIG. 10 illustrates a wireless mobile station diagram, which may be employed with aspects of the disclosure described herein.
Figure 11:
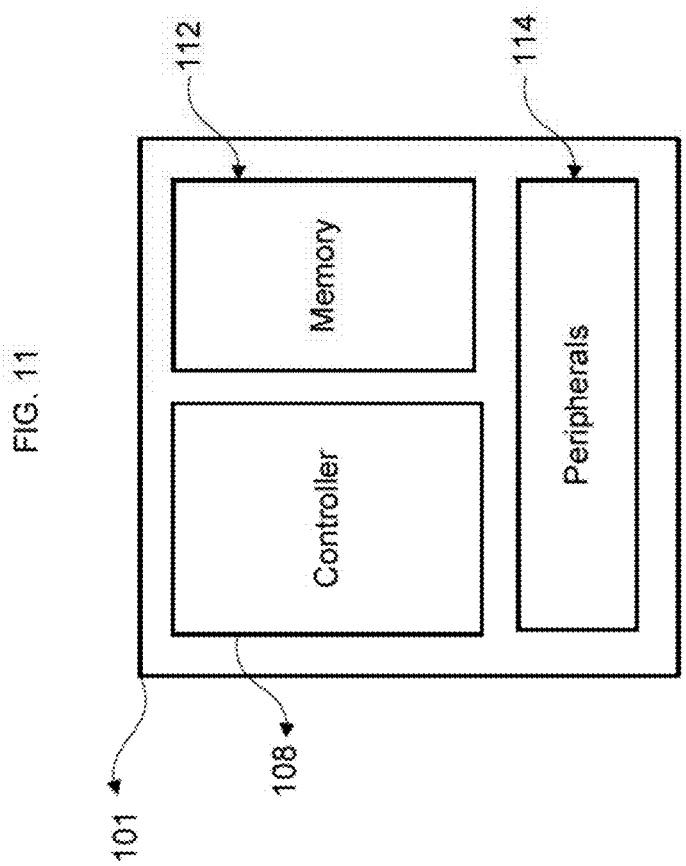
FIG. 11 illustrates an application processor subsystem for a wireless mobile station, which may be employed with aspects of the disclosure described herein.

As shown in FIG. 10, client device 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 may all be integrated as one integrated chip. The application processor subsystem 101 of FIG. 10 as detailed in FIG. 11 may include a controller 108 such as a microcontroller, another processor or other circuitry, memory 112 and peripherals 114. The controller 108 desirably handles overall operation of the client device 100. This may be done by any combination of hardware, software and firmware running on the controller 108. Such a combination of hardware, software and firmware may embody any methods in accordance with aspects of the present disclosure. In FIG. 11, the peripherals 114 such as a full or partial keyboard, video or still image display, audio interface, one or more SIM interfaces, etc. may be employed and managed through the controller 108.

Figure 12:
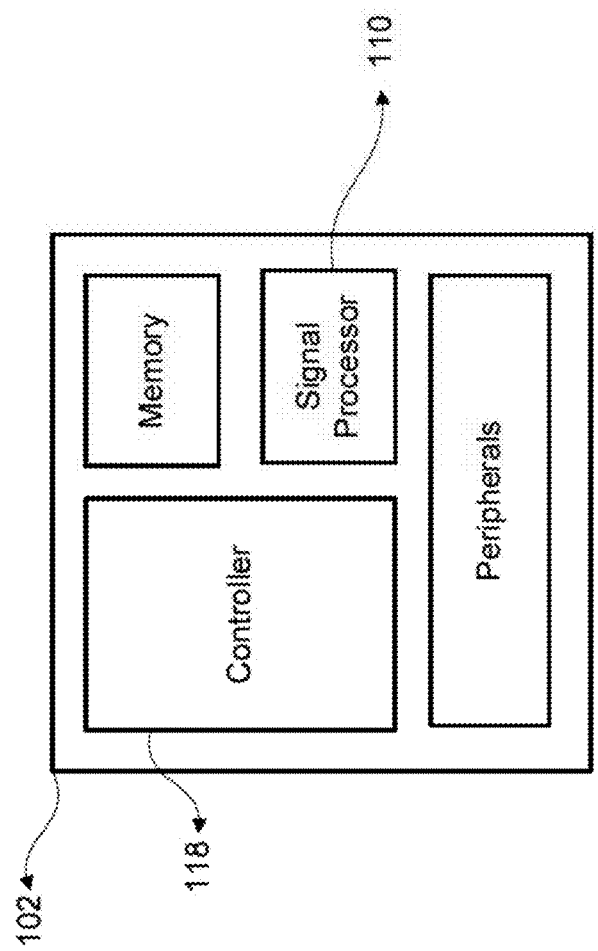
FIG. 12 illustrates a baseband subsystem for a wireless mobile station, which may be employed with aspects of the disclosure described herein.

The baseband subsystem 102 of FIG. 10 as detailed in FIG. 12 may include a controller 118 such as a microcontroller or other processor, a signal processor 110, memory, and peripherals. Aspects of the present disclosure may be implemented in firmware of the controller 108 of the application processor in FIG. 11 and/or the controller 118 of the baseband subsystem in FIG. 12. In another alternative, aspects of the present disclosure may also be implemented as a combination of firmware and hardware of the application processor subsystem 101 of FIG. 11 and/or the baseband subsystem 102 of FIG. 12. For instance, a signal processing entity of any or all of the FIG. 12 may be implemented in firmware, hardware and/or software. It may be part of the baseband subsystem, the receiver subsystem or be associated with both subsystems. In one example, the controller 118 and/or the signal processor 110 in FIG. 12 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

Figure 13:
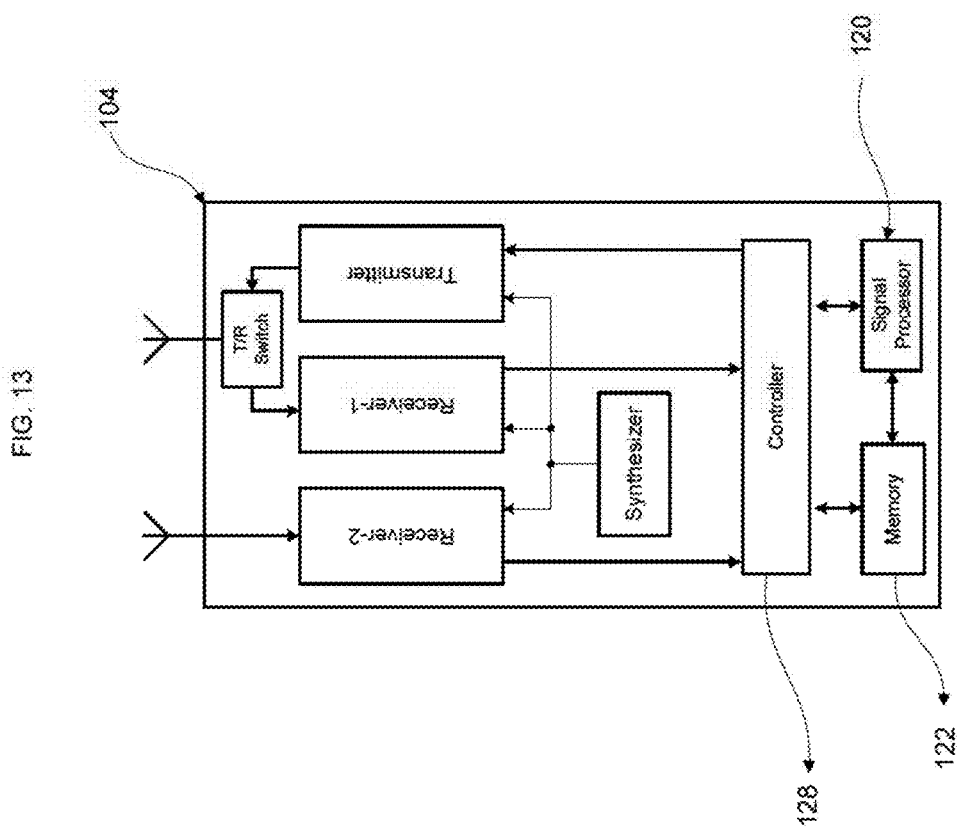
FIG. 13 illustrates a radio frequency (RF) subsystem for a wireless mobile station, which may be employed with aspects of the disclosure described herein.

The RF subsystem 104 of FIG. 10 as detailed in FIG. 13 may include a controller 128 such as a microcontroller, another processor or other circuitry. It may include memory 122 and a signal processor 120.

The consumer electronics devices that may use this disclosure may include smartphones, tablets, laptops, gaming consoles, cameras, video camcorders, car entertainment systems, etc.

By way of example only, the above-described method for performing TAU procedure on behalf of client devices may be implemented in a Hotspot Controller processing block of a mobile Hotspot such as 302 in FIG. 3.

Figure 14:
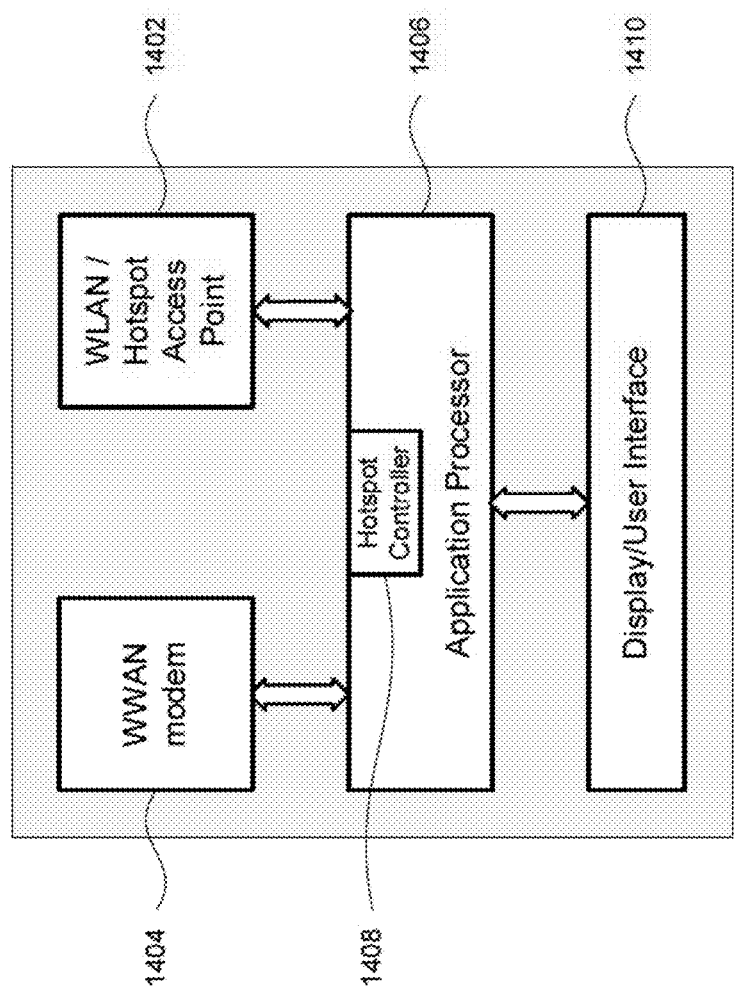
FIG. 14 illustrates a block diagram of a mobile Hotspot with Hotspot Controller implemented in an Application Processor, which may be employed with aspects of the disclosure described herein.

As shown in FIG. 14, a mobile Hotspot may include a WLAN Hotspot Access Point 1402, a WWAN modem 1404, an Application Processor 1406, and a display/user interface block 1410. The WLAN Hotspot Access Point 1402 and the WWAN modem 1404 are connected to the Application Processor 1406 via one of the commonly used standardized interfaces such as USB, SDIO, or other similar high speed interface. The Application Processor 1406 may interface with the display and other elements of the user interface such as buttons, LEDs, etc. using a standardized or custom interface. For example, General Purpose Input Output (GPIO) may be used. In another example, Serial Peripheral Interface (SPI) may be used to interface with the display and other user interface elements. The innovative aspects of the present disclosure may be implemented inside the processing block Hotspot Controller 1408. The Hotspot Controller 1408 may be implemented in the form of a software running inside the Application Processor 1406 or it may be implemented as a signal processor firmware or custom hardware block. The custom hardware block may be part of the Application Processor 1408 or it may be a standalone unit. The Hotspot Controller 1408 may be implemented as a combination of software, firmware, and hardware.

Figure 15:
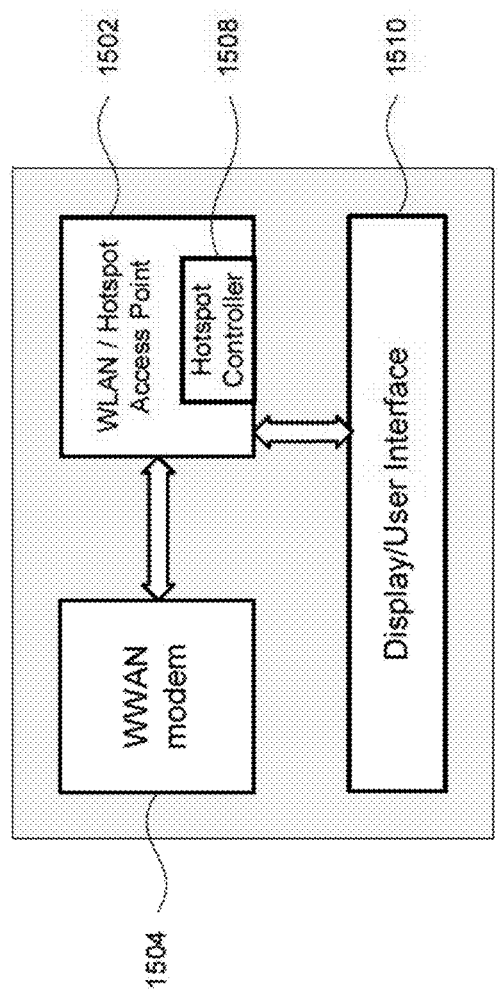
FIG. 15 illustrates a block diagram of a mobile Hotspot with Hotspot Controller implemented WLAN Hotspot, which may be employed with aspects of the disclosure described herein.

In another embodiment of the mobile Hotspot, illustrated in FIG. 15, the WLAN Hotspot Access Point 1502 may interface directly with the WWAN modem 1504 and the Display/User Interface 1510. The innovative aspects of the present disclosure may be implemented inside the processing block Hotspot Controller 1508. The Hotspot Controller 1508 may be implemented in the form of a software running inside a processor that may be a part of the WLAN Hotspot Access Point 1502. Alternatively, the Hotspot Controller 1508 may be implemented in the form of a signal processor firmware or custom hardware block. The Hotspot Controller 1508 may be implemented as a combination of software, firmware, and hardware.

Figure 16:
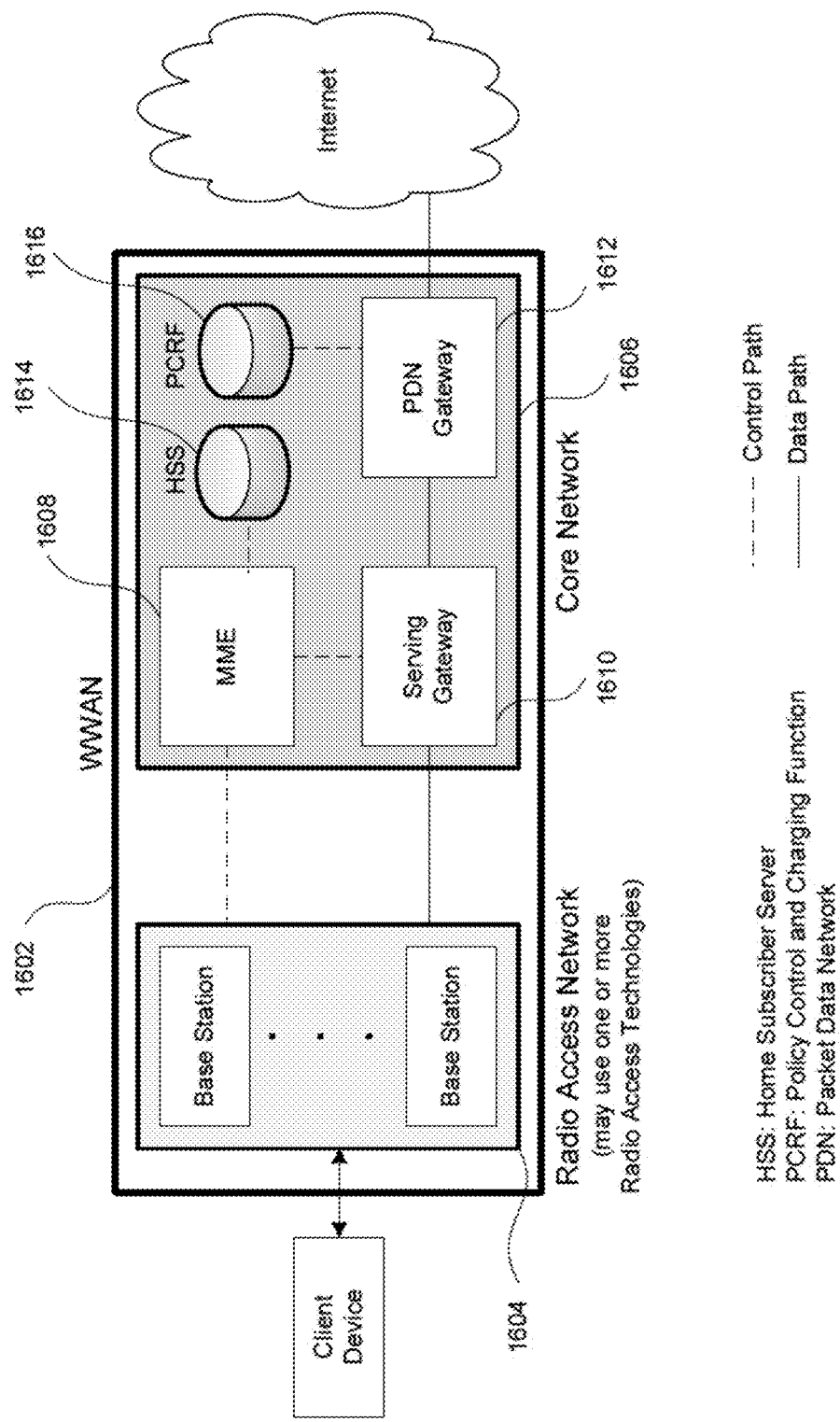
FIG. 16 illustrates a block diagram of a WWAN including a Mobility Management Entity (MME) which may be employed with aspects of the disclosure described herein.

By way of example only, as shown in FIG. 16, processing in a WWAN 1602 for the above-described method for TAU procedure by a Hotspot on behalf of one or more client devices may be implemented in a Mobility Management Entity (MME) 1608 of the Core Network 1606 of the WWAN. The Core Network 1606 may include other entities such as the Serving Gateway 1610, Packet Data Network (PDN) Gateway 1612, Home Subscriber Server (HSS) 1614, and Policy Control and Charging Function (PCRF) 1616. The WWAN 1602 also may include Radio Access Network (RAN) 1604 which may have a number of base stations which in turn may support one or more RATs.

Figure 17:
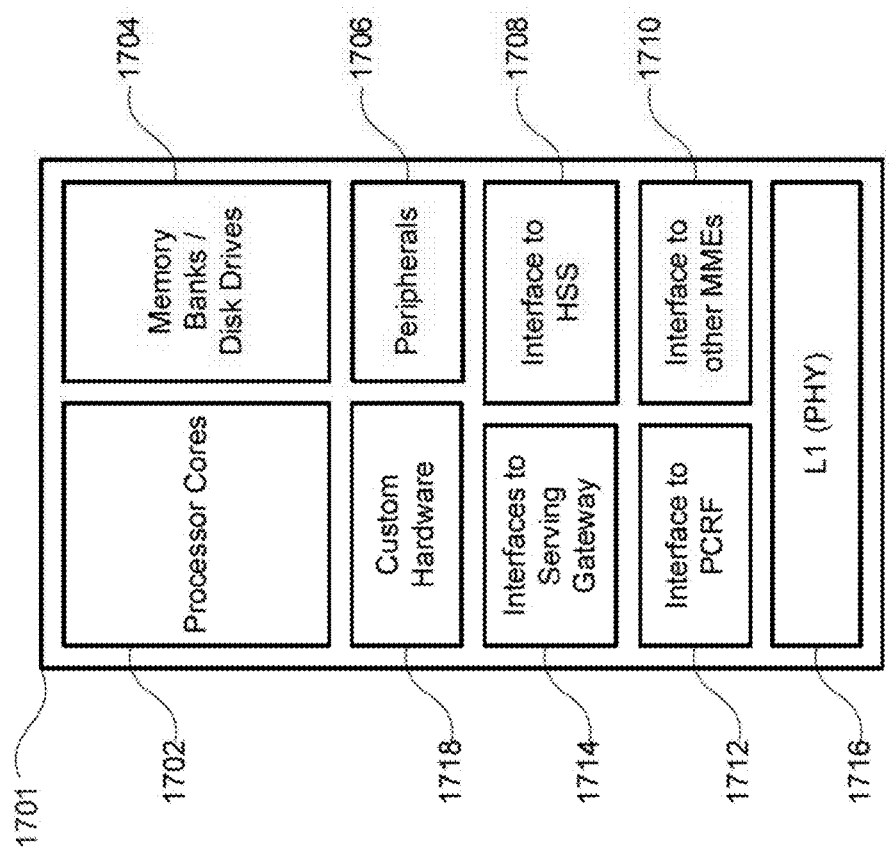
FIG. 17 illustrates a block diagram of an MME, which may be employed with aspects of the disclosure described herein.

FIG. 17 shows a block diagram of an example embodiment of an MME that may implement the processing for the above-described method for TAU procedure by a Hotspot on behalf of one or more client devices. As shown in FIG. 17, an MME 1701 may include one or more processor cores 1702, memory banks and disk drives 1704, and peripherals 1706. In addition an MME may include an "Interface to Serving Gateway" 1714, an "Interface to HSS" 1708, an "Interface to PCRF" 1712, an "Interface to other MMEs" 1710, and physical layer (PHY) hardware and software processing block 1716 for communicating with other entities of the Core Network. While many of the functions of an MME may be implemented in software, some processing functions may be implemented in "Custom Hardware" block 1718. Similarly the processing block L1 (PHY) 1716 may be a hardware block performing the layer 1 (physical layer) processing. Alternatively, some of the PHY processing may be performed in a signal processor, an FPGA or an ASIC. The processing for the above-described method for TAU procedure by a Hotspot on behalf of one or more client devices may be implemented as software, hardware or some combination of the two and the hardware may be a signal processor, FPGA, or ASIC. Some of the interfaces of the MME may be wireless and some may be wire-line including optical fiber. Some of the wireless interfaces may use line-of-sight (LOS) microwave links.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in other embodiments described herein.

The invention claimed is:

1. A method for performing a Tracking Area Update (TAU) for a client device having Wireless Wide Area Network (WWAN) capability through a mobile Hotspot device connectable to the client device over a Short Range Wireless Link (SRWL), the method comprising:
   controlling, by a processing device at the client device,
      transmitting WWAN modem capability and current status information of the client device to the mobile Hotspot device, in response to a request from the mobile Hotspot device;
      receiving, from the mobile Hotspot device, a message indicating the TAU procedure for the client device is performable at the mobile Hotspot device, wherein the message is based on a determination at the mobile Hotspot device whether a WWAN modem of the mobile Hotspot device and a WWAN modem of the client device are camped on a same WWAN;
      determining whether to accept an offer from the mobile Hotspot device to perform the TAU procedure for the client device;
      when the offer is determined not to be accepted, transmitting a second message to the mobile Hotspot device rejecting the offer; and
      when the offer is determined to be accepted, transmitting a third message to the mobile Hotspot device accepting the offer and required credentials for the mobile Hotspot device to perform the TAU for the client device.

2. The method of claim 1, wherein the message is based on a determination at the mobile Hotspot device whether the WWAN modem of the mobile Hotspot device and the WWAN modem of the at least one first client device are camped on a same Radio Access Technology (RAT), a same Tracking Area Identity (TAI) and a same cell.

3. The method of claim 1, further comprising:
   controlling, by the processing device, receiving over the SRWL, from the mobile Hotspot device, a TAU procedure WWAN response message received at the mobile Hotspot device from a given WWAN to a respective given client device.

4. The method of claim 1, further comprising:
   controlling, by the processing device, when a message is received from the mobile Hotspot device over the SRWL indicating the TAU procedure for the client device failed at the mobile Hotspot device,
      determining TAU action according to a procedure of a Radio Access Technology (RAT) for a given WWAN on which the client device is camped, or
      transmitting a request to the mobile Hotspot device to perform the TAU procedure for the client device, after elapse of a predetermined time.

5. The method of claim 4, further comprising:
   controlling, by the processing device, transmitting a response signal to the mobile Hotspot device indicating agreement whether to be informed by the mobile Hotspot device only in case of a failure in performing the TAU procedure therefor and not notified in case of success in performing the TAU procedure.

6. The method of claim 5, further comprising:
   controlling, by the processing device, receiving a notification from the mobile Hotspot device in case of the failure in performing the TAU procedure therefor.

7. The method of claim 1, further comprising:
   controlling, by the processing device, when the WWAN modem of the mobile Hotspot device and the WWAN modem of the client device are determined to be camped on first and second cells of the same WWAN and have different Tracking Area Identities (TAIs),
   receiving from the mobile Hotspot device a fourth message indicating that the TAU procedure for the client device is performable at the mobile Hotspot device in a case the client device agrees to update the mobile Hotspot device about any cell reselection to a cell belonging to a new TAI different from a previous TAI.

8. The method of claim 7, further comprising:
   controlling, by the processing device,
      accepting an offer from the mobile Hotspot to perform the TAU for the client device and updating the mobile Hotspot device when the client device reselects to the cell belonging to the new TAI different from the previous TAI.

9. The method of claim 1, further comprising:
   controlling, by the processing device, when the WWAN modem of the mobile Hotspot device and the WWAN modem of the client device are determined by the mobile Hotspot device to be camped respectively on first and second cells of the same WWAN and have different first and second Radio Access Technologies (RATs), receiving a fourth message from the mobile Hotspot device indicating that the TAU procedure for the client device is performable at the mobile Hotspot device in a case the client device agrees to update the mobile Hotspot device about any cell reselection to a cell belonging to a TAI different from a previous TAI and in the second RAT.

10. The method of claim 9, further comprising:
    controlling, by the processing device,
       accepting an offer from the mobile Hotspot device for the mobile Hotspot device to perform the TAU for the client device and updating the mobile Hotspot device when the client device reselects to the cell having the TAI different from the previous TAI and in the second RAT.

11. The method of claim 1, wherein the client device is on the same WWAN or a different WWAN on which the WWAN modem of the mobile Hotspot device is camped.

12. The method of claim 1, further comprising:
controlling, by the processing device, communication with the mobile Hotspot device to indicate agreement for the mobile Hotspot device to perform only a periodic TAU procedure for the client device.

13. The method of claim 1, further comprising:
controlling, by the processing device, communication with the mobile Hotspot device to indicate agreement for the mobile Hotspot device to perform for the client device (i) a periodic TAU procedure and (ii) a second TAU procedure when the WWAN modem of the client device camps on a given cell having a TAI different from a TAI of a last cell on which the client device was camped.

14. The method of claim 13, further comprising:
controlling, by the processing device, when the second TAU procedure is performed, updating a status of the WWAN modem of the client device when the client device camps on the given cell having the TAI different from the TAI of the last cell on which the client device was camped.

15. An apparatus for performing a Tracking Area Update (TAU) for a client device having Wireless Wide Area Network (WWAN) capability through a mobile Hotspot device connectable to the client device over a Short Range Wireless Link (SRWL), the apparatus comprising:
circuitry configured to control at the client device,
transmitting WWAN modem capability and current status information of the client device to the mobile Hotspot device, in response to a request from the mobile Hotspot device;
receiving, from the mobile Hotspot device, a message indicating the TAU procedure for the client device is performable at the mobile Hotspot device, wherein the message is based on a determination at the mobile Hotspot device whether a WWAN modem of the mobile Hotspot device and a WWAN modem of the client device are camped on a same WWAN;
determining whether to accept an offer from the mobile Hotspot device to perform the TAU procedure for the client device;
when the offer is determined not to be accepted, transmitting a second message to the mobile Hotspot device rejecting the offer; and
when the offer is determined to be accepted, transmitting a third message to the mobile Hotspot device accepting the offer and required credentials for the mobile Hotspot device to perform the TAU for the client device.

16. The apparatus of claim 15, wherein the message is based on a determination at the mobile Hotspot device whether the WWAN modem of the mobile Hotspot device and the WWAN modem of the at least one first client device are camped on a same Radio Access Technology (RAT), a same Tracking Area Identity (TAI) and a same cell.

17. The apparatus of claim 15, wherein the circuitry is configured to control receiving over the SRWL, from the mobile Hotspot device, a TAU procedure WWAN response message received at the mobile Hotspot device from a given WWAN to a respective given client device.

18. The apparatus of claim 15, wherein the circuitry is configured to control, when a message is received from the mobile Hotspot device over the SRWL indicating the TAU procedure for the client device failed at the mobile Hotspot device,
determining TAU action according to a procedure of a Radio Access Technology (RAT) for a given WWAN on which the client device is camped, or
transmitting a request to the mobile Hotspot device to perform the TAU procedure for the client device, after elapse of a predetermined time.

19. The apparatus of claim 18, wherein the circuitry is configured to control transmitting a response signal to the mobile Hotspot device indicating agreement whether to be informed by the mobile Hotspot device only in case of a failure in performing the TAU procedure therefor and not notified in case of success in performing the TAU procedure.

20. A wireless communication device comprising:
a receiver to receive a wireless communication; and
a processing device configured for performing a Tracking Area Update (TAU) for the wireless communication device as a client device having Wireless Wide Area Network (WWAN) capability through a mobile Hotspot device connectable to the client device over a Short Range Wireless Link (SRWL),
wherein the processing device is configured to control:
transmitting WWAN modem capability and current status information of the client device to the mobile Hotspot device, in response to a request from the mobile Hotspot device;
receiving, from the mobile Hotspot device, a message indicating the TAU procedure for the client device is performable at the mobile Hotspot device, wherein the message is based on a determination at the mobile Hotspot device whether a WWAN modem of the mobile Hotspot device and a WWAN modem of the client device are camped on a same WWAN;
determining whether to accept an offer from the mobile Hotspot device to perform the TAU procedure for the client device;
when the offer is determined not to be accepted, transmitting a second message to the mobile Hotspot device rejecting the offer; and
when the offer is determined to be accepted, transmitting a third message to the mobile Hotspot device accepting the offer and required credentials for the mobile Hotspot device to perform the TAU for the client device.

\* \* \* \* \*